United States Patent [19]

Bradley

[11] Patent Number: 5,038,473
[45] Date of Patent: Aug. 13, 1991

[54] POWER SAW

[75] Inventor: Jimmy D. Bradley, Alvin, Tex.

[73] Assignee: The United States of America as represented by the Administrator of the National Aeronautics and Space Administration, Washington, D.C.

[21] Appl. No.: 486,458

[22] Filed: Feb. 28, 1990

[51] Int. Cl.[5] ............... B23D 21/06; B26B 27/00; B26D 3/16
[52] U.S. Cl. ............................................. 30/92; 30/388
[58] Field of Search ................................. 30/92, 388

[56] References Cited

U.S. PATENT DOCUMENTS

| | | |
|---|---|---|
| 1,677,922 | 7/1928 | Kasztler . |
| 2,227,844 | 1/1941 | Roche ................................. 30/92 |
| 2,342,052 | 2/1944 | Jimerson et al. ................. 143/43 |
| 3,373,489 | 3/1968 | Giles ................................. 30/167 |
| 3,785,230 | 1/1974 | Lokey ................................. 30/388 |
| 4,437,237 | 3/1984 | Ducret ............................. 30/92 X |
| 4,625,464 | 12/1986 | Kubo ............................... 30/92 X |
| 4,656,742 | 4/1987 | Wagner ............................. 30/392 |
| 4,747,212 | 5/1988 | Cavdek ............................. 30/92 |

Primary Examiner—Timothy V. Eley
Attorney, Agent, or Firm—Russell E. Schlorff; Harold W. Adams; Edward K. Fein

[57] ABSTRACT

A power saw for space or robotic operations with jaw members (12,14) for clamping to a work piece (16) by an operation of a lever arm (70). The saw assembly (18) is slidably mounted on the jaw assembly (18) and fed into the work piece by a hand operated feed screw (54). The saw assembly includes a motor and gear belt (26,28). A current sensing circuit provides a current signal which actuates colored lights (96,100,102) to visually depict the load on the saw blade during the cutting operations.

11 Claims, 4 Drawing Sheets

POWER SAW

ORIGIN OF THE INVENTION

The invention described herein was made by an employee of the United States Government and may be manufactured and used by or for the Government of the United States of America for governmental purposes without the payment of any royalties thereon or therefore.

FIELD OF THE INVENTION

This invention relates to power saws and more particularly to a power saw device which can be operated in a space environment by an astronaut in a pressurized space suit and is particularly useful for operations involving the use of robots.

BACKGROUND OF THE INVENTION

Space operations are often conducted in a vacuum atmosphere by an astronaut in a pressurized space suit. The pressurized space suit limits mobility as well as visibility, sound and smell of the astronaut. Thus, where sawing operations may be required, the environmental factors severely restrict the control of the astronaut with respect to a power saw.

The following patents are exemplary of the prior art.

U.S. Pat. No. 1,677,922 discloses a cutting saw which is slidably mounted relative to a clamp member. A spring forces the saw blade into the clamped work piece. This device does not react to the cutting forces and requires two-hand operation which would be difficult in a pressurized space suit.

U.S. Pat. No. 3,373,489 discloses a pruning saw where a kerf blade spring biased into a cut to ease binding on the saw blade. This device does not clamp to a work piece or react to torque forces.

U.S. Pat. No. 2,342,052 discloses a portable saw device. This device does not clamp to a work piece nor react to the torque forces. This device requires a two-hand operation and requires the operator to supply feeding forces which are difficult to apply in a pressurized space suit.

U.S. Pat. No. 4,656,742 discloses a portable saw which utilizes an oscillating drive for a saw blade. The disclosure is concerned with guiding a saw blade at right angles to the stroke direction. The saw can be utilized with a clamping device (see FIG. 13) in the form of a separate cylindrical clamping jaw and screw. The clamping device can be pivotally attached to the saw by a bolt. After the clamping device is attached the saw is tilted or pivoted to complete a cutting operation. This device does not react to all of the cutting forces. The device requires constant tilting to achieve a complete cut of a work piece. This is obviously a drawback for a pressure suited astronaut. Additionally, a reciprocating saw blade does not perform well in a vacuum for cutting materials such as titanium and various alloy steels used in aerospace structures.

SUMMARY OF THE PRESENT INVENTION

The present invention relates to a power saw which is useful for conducting power saw operations where the saw is a) attachable to a work piece by a simple motion, b) can be operated by a simple motion, and c) provides a control designation indicative of the sawing operation. As such, this device is suitable for robotic or remote controlled applications and has utility in a space environment by an astronaut in a pressurized space suit where sawing of titanium and high alloy steels is required. The power saw includes a lever operated vise or clamping assembly for clamping to a work piece, a sawing assembly with a rotating blade member where the sawing assembly is slidably mounted on the clamping assembly and can be incrementally fed for progressive cutting of the work piece by a threaded drive member. The motor for the saw blade is attached to the saw blade assembly and workable therewith. The saw blade motor includes a current sensing means which can be used to indicate the efficiency of the operation or to control the feed of the cutting blade.

The clamping assembly includes an elongated clamping member with a jaw receptacle which receives an insertable jaw member arranged to partially circumscribe a cylindrically shaped work piece. A movable jaw member is aligned to move along an axis which is transverse and would intersect a central axis of the work piece. The movable jaw member is attached to a linkage which is lever operated to lock the jaw members in gripping engagement with the work piece. The linkage is adjustable by a screw member to accommodate different diameter work pieces.

The saw blade assembly includes the saw blade which is driven by an electric motor through a gear reduction device and a belt drive. The assembly is slidably mounted on a guide track on the clamping assembly so that the saw blade can be moved entirely through the cross section of the work piece. A feed screw is attached to the saw assembly to incrementally move the saw assembly relative to the clamping assembly.

In operation, the drive motor has a sensing circuit for detecting the current draw by the motor which is a function of the torque load on the saw blade. At no load current an amber light is visually illuminated; an acceptable cutting rate produces an increase in current to illuminate a green light. At unacceptable cutting rates, the increased current causes a red light to illuminate. The sensing circuit can easily be adapted to control the feed screw of the saw assembly.

Prior to operating the saw, the blade is coated with Braycoat grease. The operator then clamps the jaws to the work piece, starts the motor and advances the saw blade. When the cutting blade contacts the metal tube and begins cutting, the amber light goes out and the green light comes on, indicating that the proper range for the current draw is acceptable. If the saw is advanced too fast, the current exceeds the cutting range of current indicating that the cut is too heavy and a stall condition is being approached. The operator backs off or slows down the speed of advance of the cutting assembly until the green light indicator turns on indicating a reduction in the torque load on the cutting saw. The use of colored lights in the operation makes it possible for the operator to control the cutting operation by observing the lights and despite the lack of visibility, sound and smell in a space or robotic environment, the sawing operation can be controlled.

DESCRIPTION OF THE INVENTION

Figure 1:
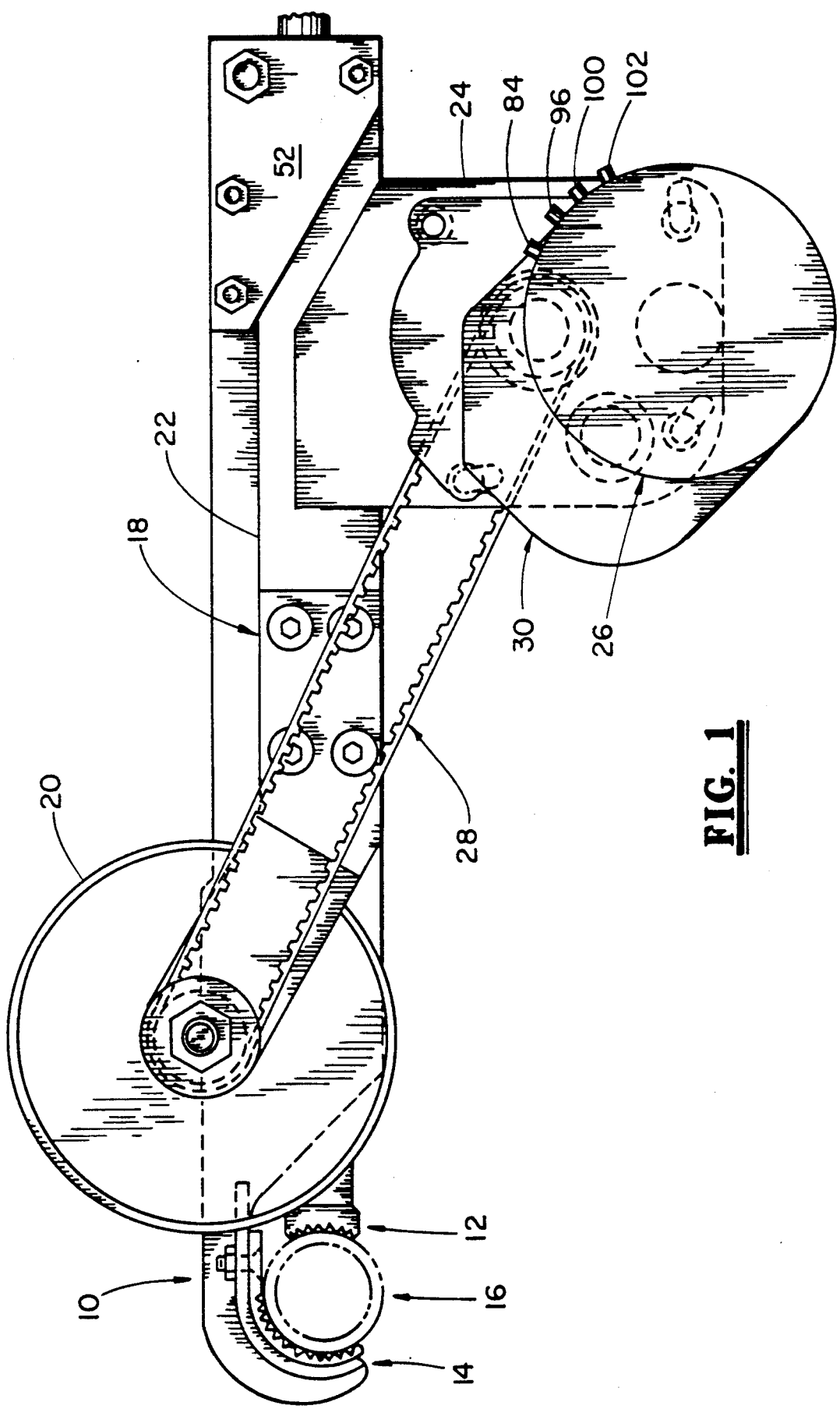
FIG. 1 is a side view of the power tool of the present invention and illustrates the motor assembly, the saw assembly and the clamping assembly from front to rear.

Referring now to the drawings, in the side view of the power saw of the present invention shown in FIG. 1, the power saw includes an elongated vice grip or clamping assembly 10 which has jaw members 12 and 14 which are adapted to grip a tubular work piece 16. The work piece in a space station is typically made of titanium or high alloy steel and can be in a vacuum atmosphere where the work is conducted by an astronaut in a pressurized space suit. The vice grip assembly 10 is an elongated assembly which provides a support for a saw assembly 18.

Disposed longitudinally adjacent to the vice grip assembly 10 is the elongated saw blade assembly 18 which includes a circularly shaped saw blade 20 rotatively mounted on an elongated saw blade support member 22. The saw blade assembly 18 is moved longitudinally relative to the vice grip assembly 10 to move the saw blade 20 through the work piece 16 gripped by the jaw members 12,14. The longitudinal movement is transverse to the central axis for the work piece 16 and the radial span of the saw blade 20 is such that the saw blade can be passed through the cross section of the work piece 16. The saw blade is a 4 inch diameter tungsten carbide abrasive cutting blade.

On the saw blade assembly 18 is a depending support base plate 24 which supports a motor assembly 26. The motor assembly 26 has an output shaft which drives a gear reducer 30 which, in turn, has an output shaft connected by a Kevlar belt 28 to the saw blade.

Figure 3:
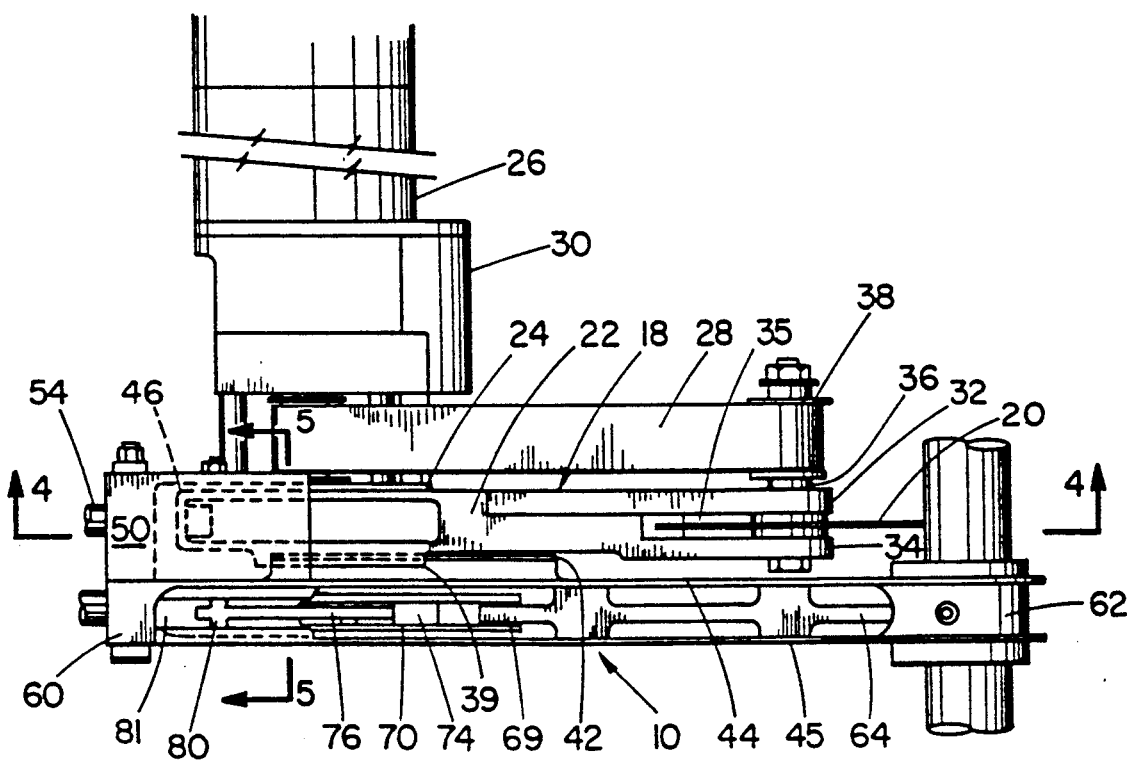
FIG. 3 is a top view of the power saw shown in FIG. 2.
Figure 4:
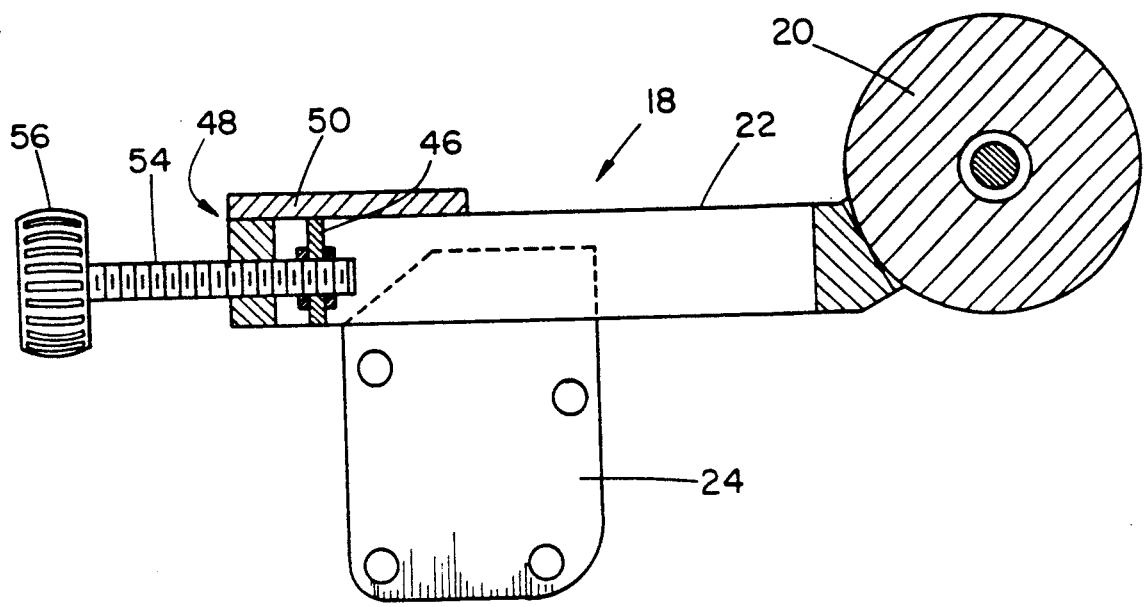
FIG. 4 is a side view in cross section taken along line 4—4 of FIG. 3 and shows the feed for the saw assembly.

The saw blade assembly 18, as illustrated in FIGS. 1, 3 and 4, includes the elongated support member 22 with a dog leg configuration so that spaced apart arm portions 32 and 34 define an opening 35 for the saw blade 20 and provide a support for a spindle 36. The spindle 36 is suitably mounted in bearings in the arm portions 32,34 and is attached to a pulley 38 so that when the pulley 38 is driven by the belt 28, the saw blade 20 is rotated between the arm portions 32,34.

Figure 5:
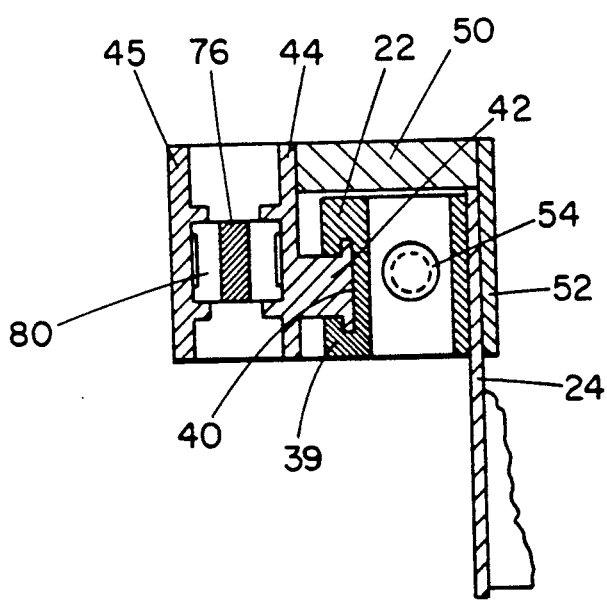
FIG. 5 is a view in cross section taken along line 5—5 of FIG. 3 and shows the sliding interconnection of the saw assembly and the clamping assembly.

As shown in FIGS. 3 and 5, along the length of the elongated portion of the support member 22 is a lateral or side projecting portion 39 which is provided with a T-shaped guide slot 40. The T-shaped guide slot 40 on the support member 22 slidably receives an elongated T-shaped guide element 42 which extends longitudinally along the side of a support member 44 for the jaw or vice grip assembly 10. Thus the saw blade assembly 18 can be slidably mounted for longitudinal movement relative to the jaw or vice grip assembly 10 by the T-shaped guide slot 40 and T-shaped guide element 42.

The rearward end 46 of the support member 22 (see FIG. 4) is located within a support housing 48 where the support housing 48 is attached to the jaw grip assembly 10 and has a top cover plate 50 and a side cover plate 52. (See FIG. 1). A feed screw 54 (FIG. 4) is threadedly received in a threaded opening in the support housing 48 and is rotatably attached to the end 46 of the saw blade support member 22. Thus, when a feed knob 56 on the feed screw 54 is rotated, the threaded interconnection will longitudinally move the saw blade assembly 18 relative to the jaw grip assembly 10.

Depending downwardly from the saw blade assembly support member 22 is the support base plate 24 (see FIGS. 1,4,5) and the motor and gear reduction assemblies 26,30, which are conventional, are attached by bolts to the support base plate 24. The motor is a 0.5 HP, 3 phase, 400 Hertz 10000 RPM motor and the gear box reduction ratio is ten to one. Attached to the motor are a starting switch 84 and lights 96,100,102.

Figure 2:
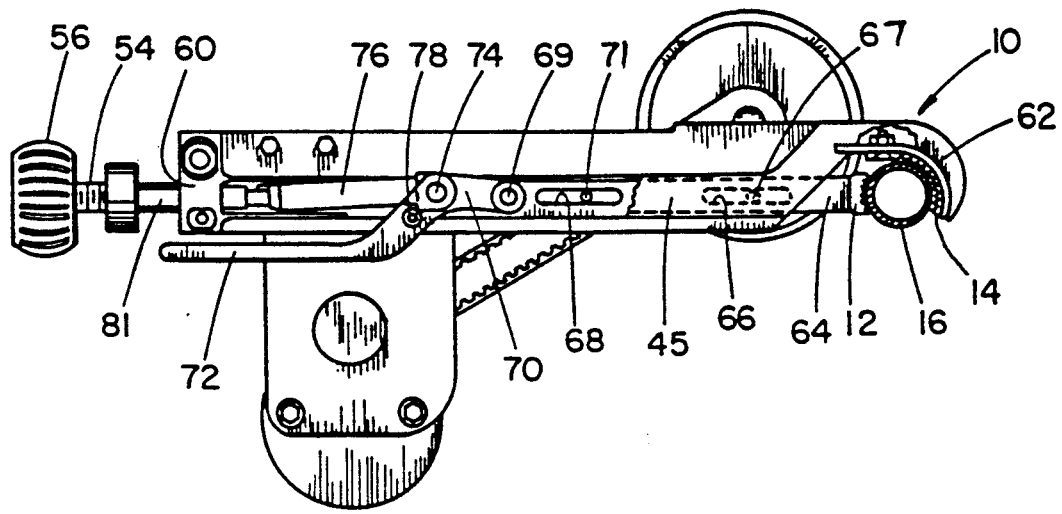
FIG. 2 is an opposite side view of the power tool of the present invention and illustrates the clamping assembly, the sawing assembly and the motor assembly from front to rear.

Referring now to FIGS. 2, 3 and 5, the jaw grip assembly 10 is elongated and is formed with parallel arranged side plate members 44,45 which terminate at a solid end piece 60 at one end and with a hook shaped jaw receptacle 62 at the other end. The jaw receptacle 62 is arranged with a removable insert jaw member 14 which can be replaced with different sized curved jaw elements for different sized work pieces. The movable jaw member 12 includes an elongated jaw arm 64. The jaw arm 64 has spaced apart elongated guide slots 66,68 which slidably receive guide pins 67,71 where the guide pins are attached to the side plate members 44,45 and extend through the respective guide slots so that the jaw arm 64 can slide longitudinally toward and away from the jaw member 14. The jaw arm 64 is connected by a pivoted connection at 69 to a locking lever 70 which is comprised of spaced apart plate members and which has an offset arm portion 72. A pivot pin connection 74 is offset from the axis of the pivot 69 and connects to a locking arm 76. A roll pin 78 extends between the spaced apart plate members of the lever 70 and acts upon the locking arm 76 to move the centerpoint of the pivot connection 74 with the locking arm 76 off center with respect to the pivot connection 69 of the locking lever 70 to the jaw arm 64. The locking arm 76 has a pivot portion 80 which is slidably received in slots in the end of the support members 44,45 and engages the end of a threaded adjustment screw 81. The adjustment screw 81 is threadedly received in the end 60 of the support member and when rotated, will move the end of the locking arm 76 toward and away from the jaw member 14. As illustrated in FIG. 2, an off center locking device is provided where the locking lever 70 can be moved to a clamping position, as shown, to provide a vice grip connection to a work piece 16.

In operation, the operator moves the locking lever 70 to an open position where the pivot pin connection 74 between the locking arm 76 and the locking lever 70 is moved out of the recess between the arm elements 44,45 thereby sliding the jaw arm 64 longitudinally rearward away from the jaw member 14. The jaw members 12,14 are positioned on the work piece 16 and the locking member 70 is moved to the closed position as shown in FIG. 2 where pressure is required on the roll pin 78 to move the locking arm 76 to its off center position between the support members 44,45 to firmly grip the work piece between the movable jaw member 12 and the jaw member 14 on the support member. When this is accomplished, the crew member is free to operate the saw device. The saw device is operated by turning on the motor and adjusting the feed knob 56 to move the saw blade assembly toward and into the work piece 16.

Figure 6:
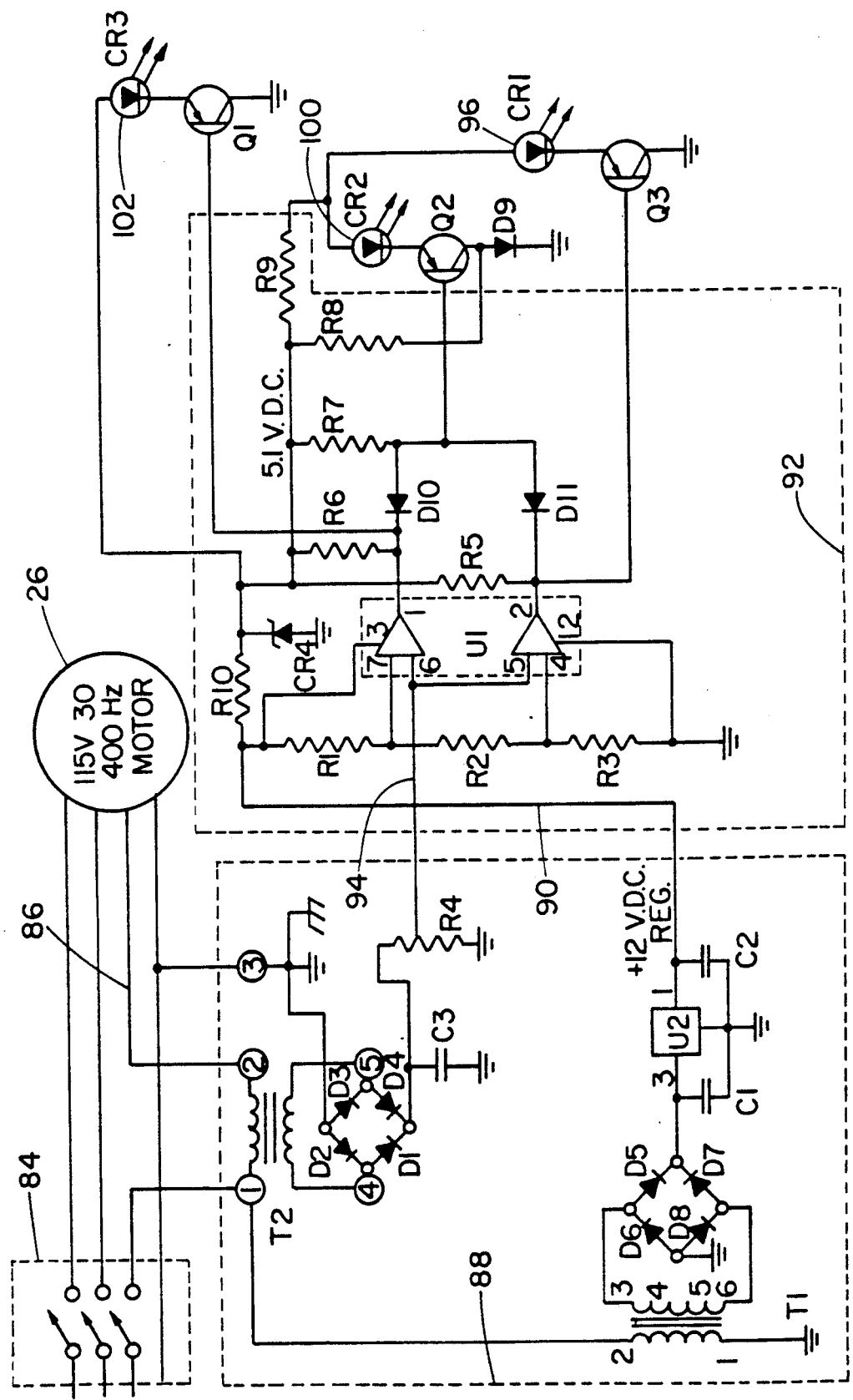
FIG. 6 is a schematic representation of the light indicator circuit for detecting the current loads on the motor.

Referring now to FIG. 6, the current sensing system is illustrated schematically. The motor 26 is a 115 volt, three phase, 400 Hz motor coupled by a switch 84 to a power source. One of the input leads 86 is coupled to a transformer and bridge unit 88 which provides a regulated direct current power source of 12 volts via conductor 90 to a current sensing network 92 and provides an input current signal via conductor 94 to the current sensing network 92. The current sensing network 92 provides a low current control signal to the transistor Q3 where the current is less than 0.6 amps and the yellow lamp 96 is illuminated. When the cutting operation is commenced, a current in the range of 0.6 and 0.95 amps provides a current control signal which turns the yellow light 96 off and the green light 100 is turned on. If the feed screw 56 is advanced too fast, the motor current will exceed 0.95 amps and the red flashing light 102 will come on indicating that the load on the saw blade is too heavy.

The sensing network 92 provides current signals indicative of the load on the saw blade. In a robotic operation, the current signals will be output to a control device for rotation of the feed screw 54 to an acceptable rotational feed as well as counter rotation of the feed screw 54 to back off the saw blade or to reduce the load on the saw.

Values for the various components in FIG. 6 are as follows:

| | |
|---|---|
| R1 | 12.1K resistor |
| R2 | 1.4K resistor |
| R3 | 1.02K resistor |
| R4 | 10K potientiometer |
| R5–R8 | 10 resistor |
| R9 | 220 ohm resistor |
| R10 | 300 ohm resistor |
| CR1 | light emitting diode (yellow) |
| CR2 | light emitting diode (green) |
| CR3 | light emitting diode (red flashing) |
| CR4 | 5.1 volt zenner diode |
| C1 | 33 uF, 25 volt capacitor |
| C2 | .1 uF, 50 volt capacitor |
| C3 | 2.2 uF, 50 volt capacitor |
| Q1, Q3 | PNP transistor |
| Q2 | NPN transistor |
| T1 | 115 volt transformer |
| T2 | current transformer |
| U1 | integrated circuit |
| U2 | 12 volt voltage regulator |

It will be apparent to those skilled in the art that various changes may be made in the invention without departing from the spirit and scope thereof and therefore the invention is not limited by that which is enclosed in the drawings and specifications but only as indicated in the appended claims.

I claim:

1. A power saw device for operations requiring simple operation motions and including
    vice means having relatively movable jaw members arranged in an elongated housing for releasable attachment to a pipe member,
    means for moving said jaw members relative to one another including a toggle operated arm member,
    saw means including an elongated carriage member slidably coupled to said elongated housing, said carriage member having a saw blade rotatably mounted thereon,
    actuator means for moving said carriage member longitudinally relative to said elongated housing,
    drive means for rotating said saw blade, said drive means including current sensing means for detecting current load on said motor as a function of the cutting forces incurred in a sawing operation, and means responsive to said current sensing means for deriving a current signal indicating the current load on said motor as a function of the cutting forces incurred in a sawing operation.

2. The power saw device as set forth in claim 1 wherein said arm member is slidably mounted for longitudinal movement in said elongated housing, and pin and slot means limit the longitudinal movement of said arm member relative to said elongated housing.

3. The power saw device as set forth in claim 2 wherein a toggle arm member is pivotally coupled to said arm member and to a locking arm member and where said toggle arm member is movable between a locking position and an unlocking position.

4. The power saw device as set forth in claim 3 and further including adjustment means on said elongated housing for changing the stroke of the longitudinal movement of said arm member and thereby change the grip of the jaw members.

5. The power saw device as set forth in claim 4 and further including at least one replaceable arcuately curved jaw element in one of said jaw members.

6. The power saw device as set forth in claim 1 wherein said elongated carriage member and said elongated housing are slidably coupled by a longitudinally extending T slot and T shaped member.

7. The power saw device as set forth in claim 6 wherein a feed screw is coupled between said elongated carriage member and said elongated housing for moving said saw means relative to said elongated housing.

8. The power saw device as set forth in claim 7 wherein a motor and gear reduction means are attached to said carriage means and belt means provides a drive for said saw blade.

9. The power saw as set forth in claim 8 wherein said current sensing means includes different colored lamp devices.

10. A power saw device for operations requiring simple operation motions and including
    vice means having relatively movable jaw members arranged in an elongated housing for releasable attachment to a pipe member,
    means for moving said jaw members relative to one another including a toggle operated arm member, said arm member being slidably mounted for longitudinal movement in said elongated housing, and pin and slot means for limiting the longitudinal movement of said arm member relative to said elongated housing,
    a toggle arm member pivotally coupled to said arm member and to a locking arm member where said toggle arm member is movable between a locking position and an unlocking position,
    saw means including an elongated carriage member slidably coupled to said elongated housing, said carriage member having a saw blade rotatably mounted thereon by a longitudinally extending T slot and T shaped member,
    a feed screw coupled between said elongated carriage member and said elongated housing for moving said saw means relative to said elongated housing,
    actuator means for moving said carriage member longitudinally relative to said elongated housing,
    drive means for rotating said saw blade, said drive means including current sensing means for detecting current load on said motor as a function of the cutting forces incurred in a sawing operation, and visual indicator means responsive to said sensing means for visually indicating the current load on said motor as a function of the cutting forces incurred in a sawing operation.

11. The power saw as set forth in claim 10 wherein said current sensing means includes different colored lamp devices.

* * * * *